Aug. 18, 1953  R. A. GOSSELIN  2,649,271

MOUNTING DEVICE

Filed July 8, 1950

INVENTOR:
RAYMOND A. GOSSELIN,
BY Robert E. Ross
AGENT.

Patented Aug. 18, 1953

2,649,271

UNITED STATES PATENT OFFICE 2,649,271

MOUNTING DEVICE

Raymond A. Gosselin, Cambridge, Mass., assignor to United-Carr Fastener Corporation, Cambridge, Mass., a corporation of Massachusetts Application July 8, 1950, Serial No. 172,768

1 Claim. (Cl. 248—358)

This invention relates generally to mounting devices and has particular reference to a shock absorbing mounting device for electronic equipment and the like.

The object of the invention is to provide a mounting device for electronic equipment which is adapted to absorb shocks and vibration to prevent them from being transmitted from a base to the mounted equipment.

A further object of the invention is to provide a mounting device as above described in which the component parts are capable of being rapidly assembled with no necessity of rubber to metal bonding.

A still further object of the invention is to provide a mounting device in which an enlarged outer periphery of a shock absorbing diaphragm is retained in a peripheral recess in a supporting base by means of an inner retaining ring which also provides gripping engagement of an annular portion of the diaphragm between the retaining ring and the supporting base.

Another object of the invention is to provide a mounting device in which a shock absorbing rubber diaphragm has a central upstanding tubular portion with a load-bearing shaft assembled therein.

Other objects of the invention will, in part, be obvious, and will, in part, appear hereinafter.

Figure 1:
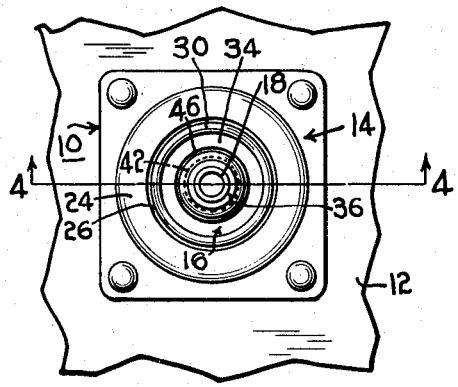
Fig. 1 is a top plan view of a mounting device embodying the features of the invention.
Figure 2:
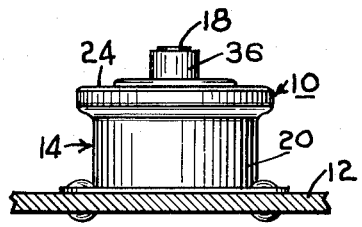
Fig. 2 is a view in elevation of the mounting device of Fig. 1.
Figure 4:
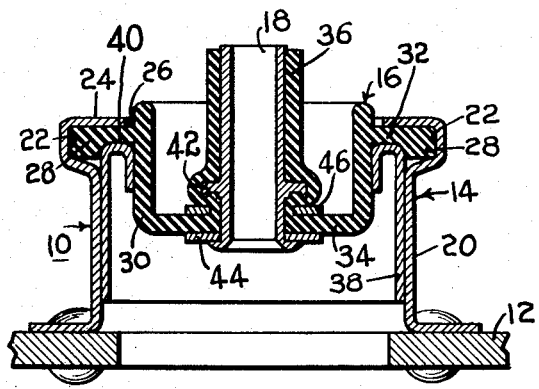
Fig. 4 is a view in section taken on line 4—4 of Fig. 1.
Figure 3:
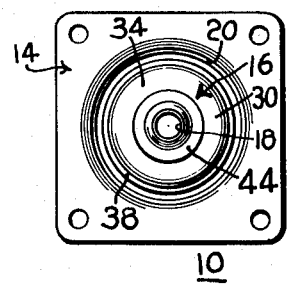
Fig. 3 is a bottom plan view of the mounting device of Fig. 1.

Referring to the drawing, there is illustrated a mounting device 10, which is adapted for assembly onto a panel 12 to receive and support a piece of electronic equipment or the like. The mounting device 10 is so constructed as to absorb shocks and vibration, so as to prevent them from being transmitted from the panel to the mounted electronic equipment, and allows the mounted equipment a certain amount of vertical and lateral movement relative to the panel 12.

The mounting device 10 comprises generally a supporting base 14, a resilient rubber diaphragm 16 assembled on the base, and a load-bearing shaft 18 mounted centrally on the diaphragm. The supporting base comprises a cylindrical wall 20 having an internal peripheral recess 22 disposed at the upper portion, and an inwardly extending diaphragm-retaining flange 24 disposed above the recess which defines a central opening 26. The rubber diaphragm 16 comprises generally an enlarged outer rim portion 28 and a medial portion 30 which, in the illustrated embodiment has a horizontal annular portion 32, a central cup-shaped portion 34, and a tubular member 36 which extends upwardly from the center of the cup-shaped portion 34 and is integral therewith.

The rubber diaphragm 16 is retained in assembly with the supporting base by a cylindrical retaining ring 38, which has the upper end turned inwardly and back on itself forming an annular bearing surface 40. The ring 38 is retained within the cylindrical wall by peripheral frictional engagement therewith, and is disposed therein so that the bearing surface 40 presses against the annular portion 32 of the diaphragm, and forces it against the diaphragm-retaining flange 24, so that the annular portion 32 is firmly gripped therebetween. The upper end of the retaining ring also partially restricts the opening to the recess 22, so that the enlarged rim portion 28 of the diaphragm is retained therein.

To provide means for supporting a mounted device, the load-supporting shaft 18 is assembled inside the tubular member 36, and has an upper flange 42 disposed thereon inside the tubular member 36 above the diaphragm, so that the tubular member is expanded outwardly over the flange. A lower flange 44 is mounted on the end of the shaft 18 below the diaphragm, and a washer 46 is assembled on the tubular member between the diaphragm and the upper flange 42 to constrict the tubular member inwardly under the upper flange. The relative spacing of the flanges and the washer is such that the diaphragm is gripped between the lower flange 44 and the washer 46, and the washer 46 is retained in position by the upper flange 42. Downward movement of the shaft relative to the tube 36 is prevented by the interaction of the upper shaft and the washer 46, and upward movement of the shaft relative to the tube is prevented by the lower flange 44 bearing against the underside of the diaphragm.

The load applied to the shaft 18 is supported by the cup-shaped portion 34 of the rubber diaphragm, and shocks and vibration transmitted to the diaphragm by the panel 12 are absorbed by the cup-shaped portion without being transmitted to the shaft.

Although the illustrated embodiment has been described as having a diaphragm formed of rubber, it will be understood that by the term rubber I mean to include any material having the desired resiliency and shock absorbing qualities, such as neoprene and other rubber-like materials.

Since all component parts of the device are mechanically assembled with no rubber to metal bonding required, the device may be produced more economically than similar mounting devices of the prior art, without sacrificing any desirable shock absorbing qualities.

Since certain obvious modifications may be made in the device without departing from the scope of the invention, it is intended that all matter contained herein be interpreted in an illustrative and not in a limiting sense.

I claim:

A mounting device comprising a supporting base having an opening therein; a rubber diaphragm assembled in the opening, said rubber diaphragm having an integral upstanding rubber tubular member disposed centrally thereon; a rigid load-bearing shaft assembled inside the tubular portion having a flange member disposed thereon above the diaphragm inside the tubular member whereby the surrounding portion of the tubular member is expanded; a constricting washer assembled around the tubular member between the diaphragm and the flange member, the internal diameter of said washer being less than the diameter of said flange, whereby the tubular member is constricted under the flange member; and a retaining washer disposed on the shaft below the diaphragm, whereby the medial portion of the diaphragm is gripped between the constricting washer and the retaining flange, and the constricting washer is retained in position against the diaphragm by the flange member disposed on the shaft.

RAYMOND A. GOSSELIN.

References Cited in the file of this patent

UNITED STATES PATENTS

| Number | Name | Date |
|---|---|---|
| 1,329,121 | Hachman | Jan. 27, 1920 |
| 1,517,553 | Fraser | Dec. 2, 1924 |
| 2,347,629 | Hale | Apr. 25, 1944 |
| 2,425,654 | Storch | Aug. 12, 1947 |
| 2,538,955 | Efromson | Jan. 23, 1951 |
| 2,592,130 | Erb et al. | Apr. 5, 1952 |

FOREIGN PATENTS

| Number | Country | Date |
|---|---|---|
| 369,154 | Italy | Mar. 13, 1939 |